June 20, 1939. L. C. ROTTER 2,162,898

RELIEF DEVICE FOR LUBRICATING APPARATUS

Filed Jan. 17, 1938

Lutwin C. Rotter, Inventor.
Delos G. Haynes, Attorney.

Patented June 20, 1939

2,162,898

UNITED STATES PATENT OFFICE 2,162,898

RELIEF DEVICE FOR LUBRICATING APPARATUS

Lutwin C. Rotter, Maplewood, Mo., assignor to Lincoln Engineering Company, St. Louis, Mo., a corporation of Missouri Application January 17, 1938, Serial No. 185,315

7 Claims. (Cl. 277—61)

This invention relates to lubricating apparatus, and more specifically to relief valves for use in apparatus such as described in my patent application, Serial No. 137,555, filed April 17, 1937, now Patent No. 2,141,022, granted May 27, 1938, for Lubricating apparatus. The present application is a continuation-in-part of the former application.

Among the several objects of the invention may be noted the provision of a relief valve for use in a lubricating system for forcing lubricant to remotely located bearings in predetermined, measured charges; the provision of a relief valve of this class which will open a by-pass only in response to relatively high pressure, but which after said by-pass has been opened will maintain the opening under relatively lower pressure; and the provision of a relief valve of the class described having improved mechanical features. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims..

Figure 1:
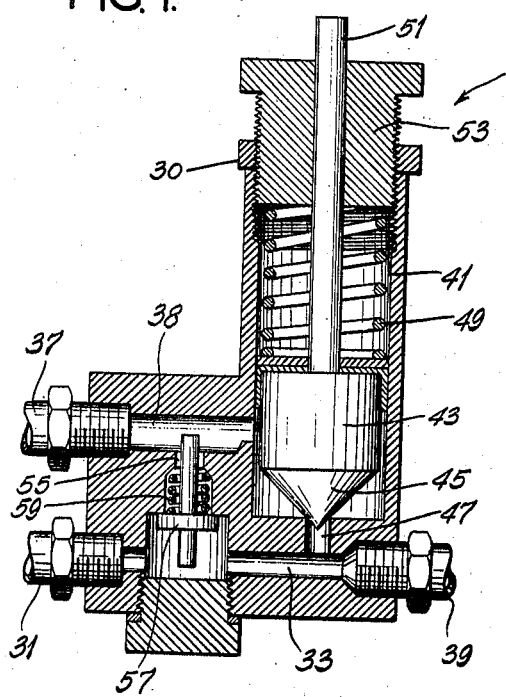
Figure 2:
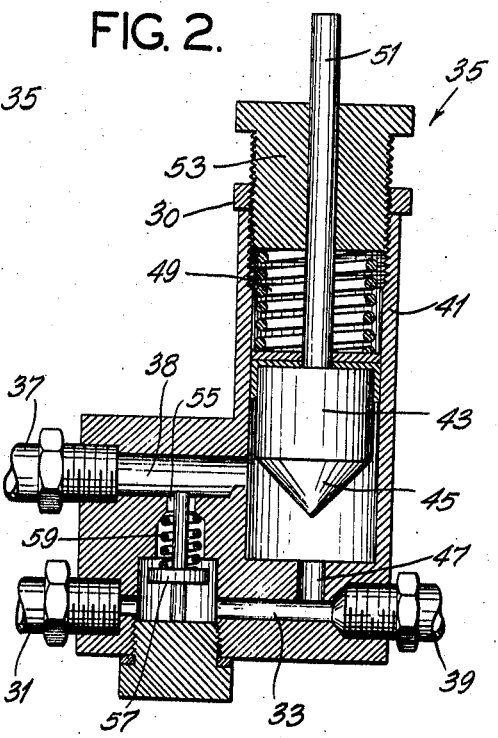
Figure 3:
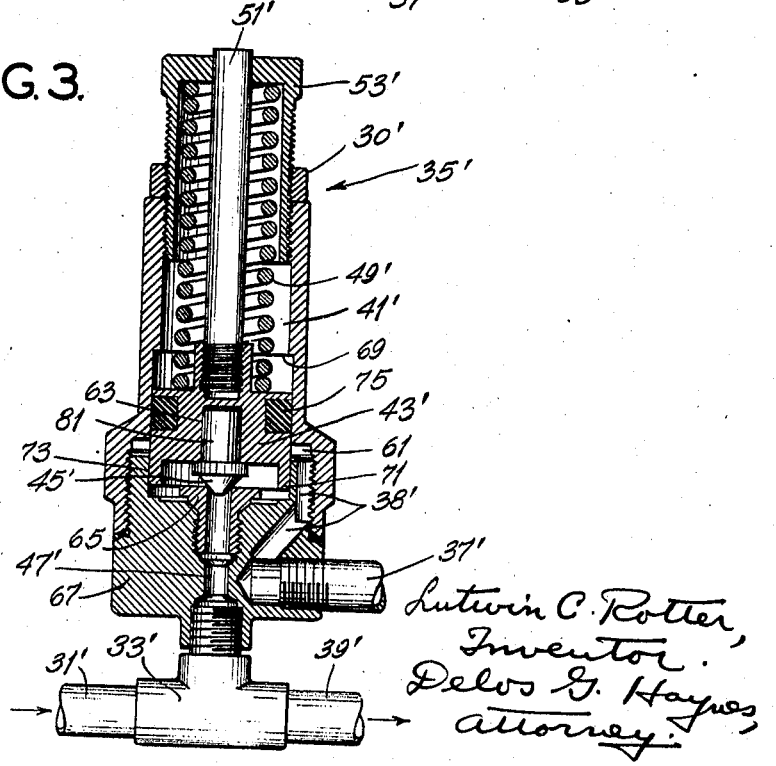

In the accompanying drawing in which are shown several of various possible embodiments of the invention, Fig. 1 is a vertical section of a relief valve, indicating a pressure-transmitting condition;

Fig. 2 is a view similar to Fig. 1 in which the valve is in relieving position; and, Fig. 3 is a view similar to Fig. 1 showing an alternative mechanical form of the invention.

Similar reference characters indicate corresponding parts throughout the several views of the drawing.

The relief valve herein described is for use in connection with a pressure line 31 from a suitable lubricant pump (not shown). The line 31 is intended to deliver lubricant to a distribution line 39. In the distribution line 39 are certain injectors (not shown) which operate under a certain pressure to receive fluid from line 39, and thereafter resist receiving fluid from the distribution line 39, even when the pressure in said line 39 builds up under pumping action. At a certain value of this pressure, it is intended that the relief valve herein shall open and permit return of lubricant through the return or by-pass line 37 to the pump supply.

It is also intended when the pump stops pumping that pressure shall be relieved from the distribution line 39 down to a value which is lower than the opening pressure of the relief valve. Thus, the relief valve (numbered generically as 35, herein) is used in connection with a by-pass 37 back to the container, but the lubricant normally may pass through a passage such as shown at 33 and to the distribution line 39.

The relief valve 35 (Figs. 1 and 2) comprises a cylinder 41 in which is a slidable piston 43 having a conical face 45 for seating at a reduced area on the edge of a relatively small passage 47 located between the passage 33 and the cylinder 41. The outlet 38 to the by-pass 37 is normally covered by said piston 43 but under certain conditions is uncovered. A spring 49 normally presses the piston downwardly, as shown in Fig. 1. A stem 51 which passes through a bearing 53 serves as a tell-tale. The passages 47 and the part of cylinder 41 below the piston 43 are referred to in the claims as a first communication.

An auxiliary communication 55 connects the transmission passage 33 with the by-pass 37 and in this communication is a valve 57 which is normally spring pressed open toward passage 33. This is done by means of an opening spring 59.

A relatively high pressure is required in the passage 33 in order to open the port 47 (for example, 3000 lbs. per sq. in.). After the port once opens, a relatively lower pressure will maintain it open (for example, 100 lbs. per sq. in.). Thus relief is effected until the pressure drops to a value far below that which was required initially to open the port 47.

The valve 57 is set to open at a pressure in passage 33 which is higher (preferably slightly higher) than said lower pressure, so that the valve 57 will remain open when the piston valve 45 closes and until a higher pressure is again built up in passage 33 than exists at the time that the valve 45 closes. But, in any event, this opening pressure of valve 57 must be lower than the opening pressure for valve 45 to insure initial relief through valve 45, (for example, on the above basis, valve 57 may remain open at 105 lbs. per sq. in.). Valve passage 55 is referred to in the claims as a second communication.

The operation of the apparatus of Figs. 1 and 2 is as follows:

Before pumping starts, the valve 57 is open, but promptly after pumping has started it becomes shut. As above described a considerable unit pressure may be exerted on the small area of the conical valve portion 45 which covers the passage 47 before the piston 43 will be raised. Thus, during the first part of the pumping period, and as the pressure builds up in the passage 33, the valve portion 45 is shut as is also valve 57 (see Fig. 1). This permits the necessary functioning of the apparatus connected with the distribution line 39, as described in my parent application, already identified.

Continued pumping then increases the pressure. The pressure in the port 47 of the relief valve 35 finally becomes great enough that the piston 43 rises to uncover the by-pass, whereupon fluid flows back through the by-pass line 37. It will be seen that as soon as the port 47 is opened, the enlarged area of the entire cone 45 is exposed to the pressure, so that thereafter a lower pressure serves to hold the piston 43 clear of the port 38. Hence, even though the pump ceases operatinng and the pressure in line 39 drops (bleeds off), the piston 43 will remain up as the lower pressures eventuate. The diameters of piston 43 and of the seat on the port 47 are so calculated that normally, before the port 47 shall have been closed, the necessary functions in the apparatus connected to line 39 shall have been performed.

The purpose of the auxiliary or second valve 57 is to meet conditions wherein a relatively long line 39 is used which may have a relatively large amount of friction therein. Under such conditions, upon cessation of pumping and bleeding of the line 39, the part of the line 39 adjacent the relief valve 35 only bleeds off promptly, while the distant remainder may, due to friction, lag in losing its relatively high pressure. This may result in the reclosure of the cone 45 over the port 47 before the distant apparatuses have been bled of pressure, in which event said distant apparatuses would not operate.

As soon as the port 47 is opened, there is a substantial balance of pressure on opposite sides of said valve 57, which then opens. It remains open, due to balance of pressure, as long as valve 45 is open. At the time the valve 45 reseats, the valve 57 is held open by its own spring to take care of bleeding under lower pressure conditions than valve 45, while open, is adapted to take care of, as under slow pressure loss in a long line with high friction.

By the time that the pump is again started the valve 45 has closed and remains closed until relatively high pressure conditions are re-established. As these high-pressure conditions are re-established the valve 57 again shuts due to excess pressure in passage 33 which is greater than the pressure of spring 59. Thus while the valve formed by the piston 43 normally serves to bleed off the pressure, the valve 57 serves to bleed it off under lower pressure conditions, as with slow leakage from a long line.

It will be seen that whenever the pressure builds up to force its way through the port 47, thereafter said port opens up wide, thereby quickly relieving the pressure. The relief of this pressure can be detected by the visual signal at telltale 51.

In Fig. 3 is shown a modified form of the relief valve 35' in which like primed numerals designate like parts. The improved features of this form of the invention are primarily structural. In this form the piston 43' traverses a counter-bore 61 which communicates with the passage 38' leading to the by-pass line 37'. The piston 43' is packed against leakage in cylinder 41' by packing 75. Also, the conical valve portion 45' of the piston 43' is separate and made as a hardened steel insert, fitted loosely into a socket 63 within the piston 43'. This conical insert 45' engages with a hardened seat 65 which is screwed into the body portion 67.

The body portion 67 forms the base to which is threaded the cylinder 41'. Upward movement of the piston 43' is limited by a shoulder 69 in the cylinder 41'. The lower edge of the piston 43' is formed as a lip 71 which cooperates slidably with some clearance with a counterbore 73 in the body 67. The lower edge of the lip 71 passes above the counterbore 73 when pressure forces the piston 43' against the shoulder 69.

The length of the shank 81 of the valve insert 45' is long enough that when the top of the piston 43' strikes the shoulder 69, the shank 81 will still extend part way into the socket 63. The shank 81 is made loose enough to permit of self-centering of the valve 45' against seat 65. If the valve drops down, it will not leave the socket 63 entirely.

The separable conical valve 45' associated with the piston 43' in Fig. 3 is the equivalent of the piston 43 with the conical nose 45 shown in Figs. 1 and 2, so far as the functions of the apparatus are concerned. However, the valve 45' of the piston 43 in Fig. 3 has the stated self-centering structural advantages.

The operation of the form of the invention shown in Fig. 3 is analogous to that related in connection with the forms shown in Figs. 1 and 2, with the exception of the fact that the closer fit between lip 71 and the counterbore 73 effects more throttling than the looser fit between the cylinder 41' and piston 43' in Figs. 1 and 2. Thus, there is a tendency to delay the period of pressure reduction. This results in better assurance of a longer line being properly bled off without aid of the auxiliary valve 57'. In other words, the closing of valve 45' (Fig. 3) is delayed more than that of valve 45 (Figs. 1 and 2).

It will be seen from the above that as the pressure is bled off from under the piston 43', in both forms of the invention, the relationship between the passage 38', cylinder 41', and piston 43' is such that the piston increasingly throttles the outlet 38' as the pressure under the piston goes down. The effect of this is to slow down the pressure release as the pressure goes down, so that more time is given to bleed long lines. This tends to extend the scope of use of the device for long lines, with or without the valve 57. In the Fig. 3 form, the fit between recess 73 and lip 71 is of the throttling and not of the completely sealing type.

Although there has not been shown in connection with the form of Fig. 3 any valve corresponding to valve 57, such a valve may be used. Furthermore, the valve 57 is not always necessary, as with short lines having low friction therein. Moreover, a valve such as 57 may be used as a separate device in connection with a separate relief valve such as described.

Another advantage in the case of the reduced clearance between counterbore 73 and the piston 43' (Fig. 3), is that better conditions of alignment are maintained for the valve 45' and its seat 65. Thus, the looseness of valve 45' in its socket 63 may be at a minimum for effective self-centering.

It will be seen that in all forms of the invention herein a lock nut 30 or 30' is threaded to the member 53 or 53', as the case may be. This permits of locking in position said member 53 (or 53') after adjustment to any predetermined position. Thus, it is possible to vary the pressure exerted by spring 49 or 49' and the resulting pressure condition in the passage 33 or 33' at which the valve 45 or 45' will open.

In view of the above, it will be seen that the several objects of the invention are achieved, and other advantageous results attained.

As many changes could be made in carrying out the above constructions without departing from the scope of the invention, it is intended that all matter contained in the above description or shown in the accompanying drawing shall be interpreted as illustrative and not in a limiting sense.

I claim:

1. A relief valve comprising a pressure-transmitting passage, a by-pass, a first communication between said passage and said by-pass including a relatively small passage and a reltively large cylinder, a piston of relatively large area fitting said cylinder, a relatively small end area of said piston covering said small passage, a spring biasing said piston normally to close said passage, said small end area requiring a relatively high pressure to open said piston, but the relatively large piston area requiring a relatively small pressure to maintain opening, a second communication between said transmitting passage and said by-pass, and valve means normally urged open by a spring and adapted to open the second communication under pressure in the transmitting passage which is above the closing pressure of the piston as the first communication is closed.

2. A relief valve comprising a pressure-transmitting passage, a by-pass, a first communication between said passage and said by-pass including a relatively small passage and a relatively large cylinder, a pressure-receiving means in said cylinder, a relatively small area of said pressure-receiving means covering said small passage, means biasing said pressure-receiving means normally to close said passage, said small area requiring a relatively high pressure to open said piston, but the relatively large pressure-receiving means requiring a relatively small pressure to maintain the opening, a second communication between said transmitting passage and said by-pass, and valve means adapted to close the second communication under the pressure in the transmitting passage associated with a closed position of the pressure-receiving means, but said valve means being normally biased to remain open under pressure in the pressure-transmitting passage above the pressure on the piston as the first communication is being closed, the transmitting passage and the two communications being arranged so that the opposite sides of said biased valve means are subjected to substantially balancing pressures when the piston permits its associated passage to be open.

3. A relief valve comprising a pressure-transmitting passage, a by-pass, a first communication between said passage and said by-pass including a relatively small passage and a relatively large cylinder, a piston of relatively large area fitting said cylinder, a relatively small end area of said piston covering said small passage, a spring biasing said piston normally to close said passage, said small end area requiring a relatively high pressure to open said piston but the relatively large piston area requiring a relatively small pressure to maintain opening, a second communication between said transmitting passage and said by-pass, and valve means normally biased toward open position and adapted to close the second communication under substantial pressure in the transmitting passage above the closing pressure of the piston when the first communication is closed and adapted to hold open the second communication when under a pressure in the transmitting passage which is the closing pressure of the piston as the first communication closes, said piston, cylinder and by-pass being so related that the piston increasingly throttles the by-pass as pressure decreases.

4. A relief valve comprising a pressure-transmitting passage, a by-pass, a first communication between said passage and said by-pass including a relatively small passage and a relatively large cylinder, a piston of relatively large area fitting said cylinder, a relatively small end area of said piston covering said small passage, a spring biasing said piston normally to close said passage, said small end area requiring a relatively high pressure to open said piston but the relatively large piston area requiring a relatively small pressure to maintain opening, a second communication between said transmitting passage and said by-pass, valve means normally biased toward open position and adapted to close the second communication under substantial pressure in the transmitting passage above the closing pressure of the piston when the first communication is closed and adapted to open the second communication when under a pressure in the transmitting passage which is the closing pressure of the piston as the first communication closes, the transmitting passage of the two communications being arranged so that opposite sides of said valve means are subjected to substantial balancing pressures after the piston opens the first passage, said piston, cylinder and by-pass being so related that the piston increasingly throttles the by-pass as pressure decreases.

5. A relief valve comprising a pressure-transmitting passage, a by-pass, a first communication between said passage and said by-pass including a relatively small passage and a relatively large cylinder, a piston of relatively large area fitting said cylinder, a relatively small end area of said piston covering said small passage, a spring biasing said piston normally to close said passage, said small end area requiring a relatively high pressure to open said piston, but the relatively large piston area requiring a relatively small pressure to maintain opening, and a second communication between said transmitting passage and said by-pass, valve means adapted to close the second communication under substantial pressure in the transmitting passage but normally biased to remain open under pressure in the transmitting passage slightly above the closing pressure existing as the first communication is closing.

6. A relief valve comprising a pressure-transmitting passage, a by-pass, a first communication between said passage and said by-pass, valve means associated with the first communication, said valve means being adapted to hold the communication closed up to a relatively high pressure in the transmitting passage, and to maintain an opening under relatively lower pressure therein after the communication has once opened at the relatively higher pressure, and to close under still lower pressure conditions, a second communication between said transmitting passage and said by-pass, and normally biased valve means in the second communication adapted to move against its normal bias to hold closed the second communication under pressures in the transmitting passage constituting a range from a predetermined value up to the pressure required initially to open the valve in the first communication, but adapted under its bias to move to open the second communication under pressure conditions existing in the first communication from a time prior to reclosing of its valve until after the valve has closed under said still lower pressure conditions.

7. A relief valve comprising a pressure-transmitting passage, a by-pass, a first communication between said passage and said by-pass, a valve associated with the first communication normally biased to a closed position wherein any pressure difference up to a predetermined high pressure difference may be maintained between the passage and the by-pass without opening the valve, the valve being adapted to open at said predetermined high pressure difference and to remain open at a pressure difference between the passage and the by-pass which is of a value lower than said high pressure difference, a second communication between the passage and the by-pass, valve means in the second communication normally biased open toward the pressure-transmitting passage and adapted to open and remain open under a pressure at and below said lower pressure difference.

LUTWIN C. ROTTER.